United States Patent
Kumagai et al.

(10) Patent No.: US 12,407,918 B2
(45) Date of Patent: Sep. 2, 2025

(54) ELECTRONIC DEVICE

(71) Applicant: CANON KABUSHIKI KAISHA, Tokyo (JP)

(72) Inventors: Koichi Kumagai, Saitama (JP); Taira Komatsuzaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 18/527,535

(22) Filed: Dec. 4, 2023

(65) Prior Publication Data

US 2024/0292088 A1     Aug. 29, 2024

(30) Foreign Application Priority Data

Feb. 28, 2023    (JP) ................ 2023-029349

(51) Int. Cl.
     *H04N 23/63*      (2023.01)
     *H04N 23/62*      (2023.01)

(52) U.S. Cl.
     CPC ........... *H04N 23/633* (2023.01); *H04N 23/62* (2023.01)

(58) Field of Classification Search
     CPC ..... H04N 23/62; H04N 23/633; H04N 23/675
     USPC ................................................... 348/333.02
     See application file for complete search history.

(56) References Cited

U.S. PATENT DOCUMENTS

| | | | | |
|---|---|---|---|---|
| 6,937,284 | B1* | 8/2005 | Singh | H04N 23/635 348/346 |
| 7,324,151 | B2* | 1/2008 | Onozawa | H04N 23/673 348/346 |
| 8,711,273 | B2* | 4/2014 | Hamada | H04N 23/635 348/346 |
| 9,459,514 | B2* | 10/2016 | Ichihara | G03B 13/16 |
| 9,509,913 | B2* | 11/2016 | Kaneko | H04N 23/61 |
| 9,667,861 | B2* | 5/2017 | Lee | H04N 23/64 |
| 9,888,182 | B2* | 2/2018 | Sawa | H04N 23/675 |
| 11,076,086 | B2* | 7/2021 | Matsumoto | H04N 23/663 |
| 11,206,354 | B2* | 12/2021 | Matsumoto | G03B 13/34 |
| 11,509,829 | B2* | 11/2022 | Sato | H04N 23/631 |
| 2006/0029381 | A1* | 2/2006 | Onozawa | H04N 23/673 348/E5.045 |
| 2012/0057062 | A1* | 3/2012 | Hamada | H04N 23/673 348/E5.045 |

(Continued)

FOREIGN PATENT DOCUMENTS

JP      2004-258086 A     9/2004

*Primary Examiner* — Pritham D Prabhakher

(74) *Attorney, Agent, or Firm* — Cowan, Liebowitz & Latman, P.C.

(57) ABSTRACT

An electronic device performs control to display a guide indicating a current focus position in a focus range from a first end on a close side to a second end on an infinity side, wherein the guide includes a focus range portion which is long in a predetermined direction, and includes one end whose a position in the predetermined direction corresponds to the first end, and an other end whose a position in the predetermined direction corresponds to the second end, a length of the focus range portion is a length according to an operation range of a focus operation, and a position of the first end and a position of the second end at the focus range portion are positions according to a relationship between an operation direction of the focus operation and a change direction of a focus position.

23 Claims, 14 Drawing Sheets

(56) References Cited

U.S. PATENT DOCUMENTS

| | | | | |
|---|---|---|---|---|
| 2014/0267869 A1* | 9/2014 | Sawa | ..................... | H04N 23/66 |
| | | | | 348/333.03 |
| 2014/0368719 A1* | 12/2014 | Kaneko | ................ | H04N 23/672 |
| | | | | 348/333.02 |
| 2015/0244929 A1* | 8/2015 | Lee | ..................... | H04N 23/633 |
| | | | | 348/346 |

* cited by examiner

ELECTRONIC DEVICE

BACKGROUND OF THE INVENTION

Field of the Invention

The present invention relates to a function of assisting a focus operation of manual focus.

Description of the Related Art

When video work is shot, focus adjustment to (focusing on) an object is performed by a manual operation. As an assist function of such an operation (focus operation), there is a focus position guide display function of displaying a guide which is called a focus position guide. A focus position guide indicates a current focus position (focus position) (Japanese Patent Application Publication No. 2004-258086). A user (photographer) can perform a focus operation of moving a focus position to a desired focus position while looking at the focus position guide.

However, a conventional focus position guide display function displays the same focus position guide irrespectively of a lens type. Therefore, a user's sense and display of the focus position guide during the focus operation do not match, and the user cannot easily (intuitively) perform a desired focus operation.

SUMMARY OF THE INVENTION

The present invention provides a technique which enables a user to easily (intuitively without hesitation) a desired focus operation.

The present invention in its first aspect provides an electronic device including at least one memory and at least one processor which function as: an acquisition unit configured to acquire operation member information which is information on an operation member for a focus operation; and a display control unit configured to perform control to display a guide indicating a current focus position in a focus range from a first end on a close side to a second end on an infinity side based on the operation member information, wherein the guide includes a focus range portion which is a portion which is long in a predetermined direction, and includes one end whose a position in the predetermined direction corresponds to the first end, and an other end whose a position in the predetermined direction corresponds to the second end, a length of the focus range portion is a length according to an operation range which is a range of an operation amount of the focus operation which a user is able to perform on the operation member, and a position of the first end and a position of the second end at the focus range portion are positions according to a relationship between an operation direction of the focus operation on the operation member and a change direction of a focus position.

The present invention in its second aspect provides an electronic device including at least one memory and at least one processor which function as: a display control unit configured to perform control to display a guide indicating a current focus position in a focus range from a first end on a close side to a second end on an infinity side, wherein the focus position is able to be changed by rotating a focus ring provided to a lens, the guide includes an arc including one end whose position corresponds to the first end, and an other end whose position corresponds to the second end, a center angle of the arc substantially matches with a rotation angle of the focus ring for changing the focus position from the first end to the second end, movement of the guide in a same rotation direction as a rotation direction of the focus ring indicates a change of the focus position, and the guide is different in a case of a first lens and in a case of a second lens.

The present invention in its third aspect provides a control method of an electronic device, including: acquiring operation member information which is information on an operation member for a focus operation; and performing control to display a guide indicating a current focus position in a focus range from a first end on a close side to a second end on an infinity side based on the operation member information, wherein the guide includes a focus range portion which is a portion which is long in a predetermined direction, and includes one end whose a position in the predetermined direction corresponds to the first end, and an other end whose a position in the predetermined direction corresponds to the second end, a length of the focus range portion is a length according to an operation range which is a range of an operation amount of the focus operation which a user is able to perform on the operation member, and a position of the first end and a position of the second end at the focus range portion are positions according to a relationship between an operation direction of the focus operation on the operation member and a change direction of a focus position.

The present invention in its fourth aspect provides a non-transitory computer readable medium that stores a program, wherein the program causes a computer to execute a control method of an electronic device, the control method including: acquiring operation member information which is information on an operation member for a focus operation; and performing control to display a guide indicating a current focus position in a focus range from a first end on a close side to a second end on an infinity side based on the operation member information, wherein the guide includes a focus range portion which is a portion which is long in a predetermined direction, and includes one end whose a position in the predetermined direction corresponds to the first end, and an other end whose a position in the predetermined direction corresponds to the second end, a length of the focus range portion is a length according to an operation range which is a range of an operation amount of the focus operation which a user is able to perform on the operation member, and a position of the first end and a position of the second end at the focus range portion are positions according to a relationship between an operation direction of the focus operation on the operation member and a change direction of a focus position.

Further features of the present invention will become apparent from the following description of exemplary embodiments with reference to the attached drawings.

DESCRIPTION OF THE EMBODIMENTS

Figure 1:
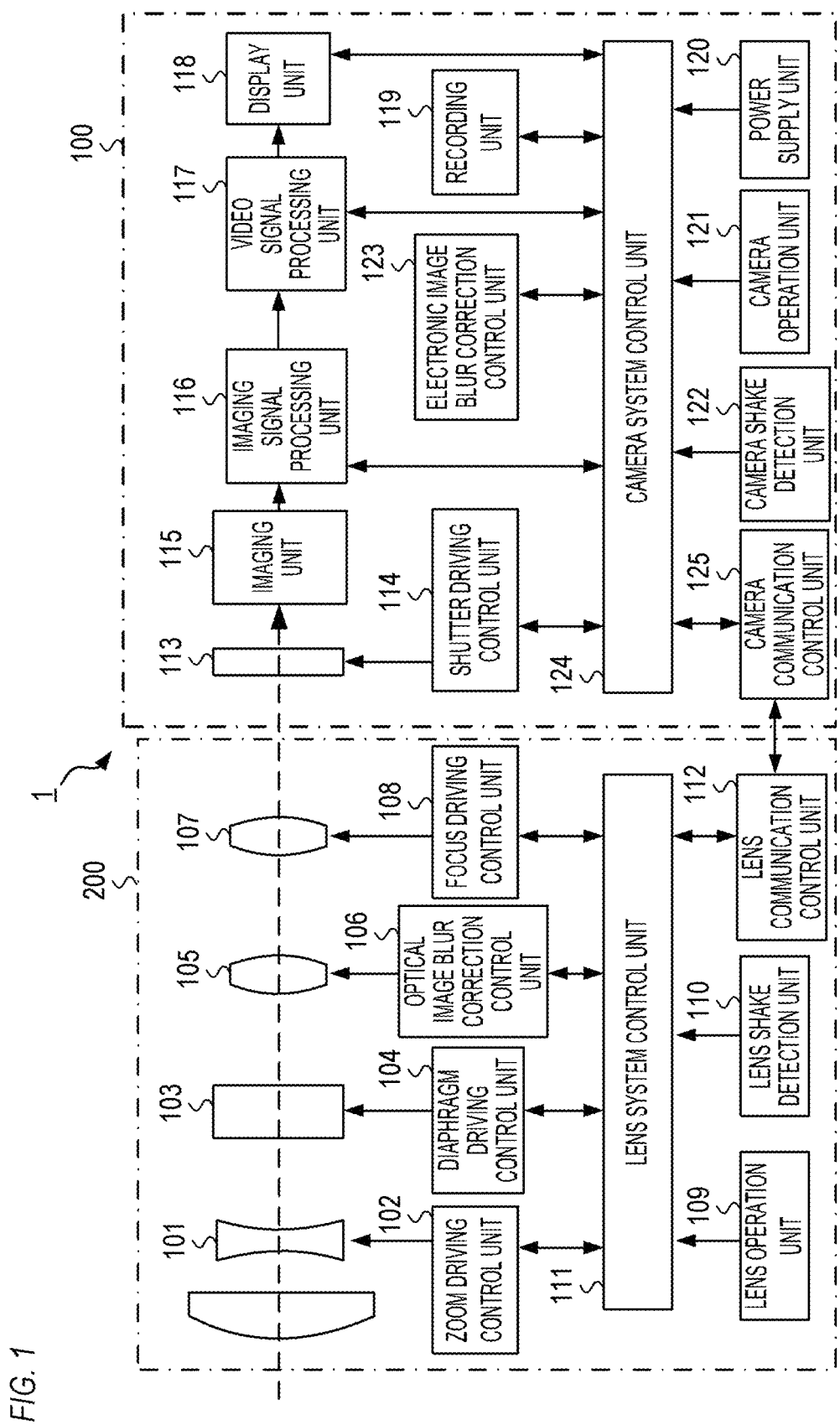
FIG. 1 is a block diagram illustrating a configuration of an imaging device according to the present embodiment.

Hereinafter, embodiments of the present invention will be described in detail with reference to the accompanying drawings. Note that the following embodiments do not limit the invention according to the claims. The following embodiments describe a plurality of features. However, all of the plurality of these features are not indispensable for the present invention, and the plurality of features may be combined arbitrarily. Furthermore, same or similar components will be assigned the same reference numerals, and overlapping description thereof will be omitted.

First Embodiment

Configuration of Imaging Device

FIG. 1 is a block diagram schematically illustrating a configuration example of an interchangeable-lens type digital camera for shooting still images and moving images as an example of an imaging device according to the first embodiment of the present invention. Note that the present invention is not limited to the digital camera, and is applicable to various imaging devices. Furthermore, the present invention is applicable to an electronic device which is separate from the imaging device such as an external monitor connected to the imaging device. The external monitor may be a dedicated display device, or may not be a dedicated display device. Various electronic devices such as smartphones and tablet terminals can be used as the external monitor, and the present invention is applicable to the various electronic devices.

An imaging device 1 in FIG. 1 mainly includes a detachable lens 200 and a camera main body unit 100, and the lens 200 is attached to the camera main body unit 100 to use.

The lens 200 will be described. In the lens 200, a zoom unit 101 includes a zoom lens which changes magnification, and a zoom driving control unit 102 controls driving of the zoom unit 101. A diaphragm unit 103 has a diaphragm function, and a diaphragm driving control unit 104 controls driving of the diaphragm unit 103. An image blur correction unit 105 includes an image blur correction lens (e.g., shift lens), and an optical image blur correction control unit 106 controls driving of the image blur correction unit 105. A focus unit 107 includes a focus lens which changes a focus position (a focal point and a focus adjustment position), and a focus driving control unit 108 controls driving of the focus unit 107.

A lens operation unit 109 includes various operation members for changing zoom, diaphragm, and focus states of the lens 200. For example, the lens operation unit 109 includes an operation member (a focus operation member such as a focus ring) for a focus operation (manual focus operation) of changing the focus position. A lens shake detection unit 110 detects a shake amount of the lens 200, and outputs a signal indicating the detected shake amount to a lens system control unit 111. Note that the various operation members for changing the zoom, diaphragm, and focus states of the lens 200 may not be the operation members included in the lens operation unit 109. For example, part of the operation members such as the focus operation member may be an operation member connected to the lens 200, may be an operation member included in the camera main body unit 100, or may be an operation member connected to the camera main body unit 100.

The lens system control unit 111 includes a Central Processing Unit (CPU), and integrally controls the overall lens 200 (each driving control unit and each correction control unit). The lens system control unit 111 can communicate with a camera system control unit 124 of the camera main body unit 100 via a lens communication control unit 112 and a camera communication control unit 125 of the camera main body unit 100. Furthermore, the lens system control unit 111 acquires information which is necessary for the above-described integral control from each unit included in the lens 200. For example, the lens system control unit 111 acquires focus operation information related to a focus operation on the focus operation member from the lens operation unit 109. The focus operation information includes, for example, a current focus position, a direction of the focus operation, and an operation amount of the focus operation. The lens system control unit 111 may acquire current position information of each lens. The lens system control unit 111 transmits at least part of the acquired information to the camera system control unit 124 via the lens communication control unit 112 and the camera communication control unit 125 periodically or in response to a request from the camera system control unit 124. Furthermore, the camera system control unit 124 performs various processing using the information received from the lens system control unit 111.

Next, the camera main body unit 100 will be described. In the camera main body unit 100, a shutter unit 113 controls entry of light (object light or light from a object) having passed through the lens 200 into the camera main body unit 100. A shutter driving control unit 114 controls driving of the shutter unit 113. An imaging unit 115 includes an imaging unit (image sensor) such as a CCD or CMOS sensor, and photoelectrically converts the light having passed through the shutter unit 113 and outputs an electric signal which expresses an optical image of the object. Note that the first embodiment assumes that the imaging element can individually receive a plurality of beams of light having passed through a plurality of exit pupil areas of the lens 200, and output a plurality of electric signals (a plurality of electric signals associated with a plurality of exit pupil areas) corresponding to the plurality of beams of light. Furthermore, the camera system control unit 124 can perform focus detection of a so-called image plane phase-difference system based on the plurality of electric signals output from the imaging element. The imaging element can output a synthesis signal obtained by synthesizing (adding) the plurality of electric signals.

An imaging signal processing unit 116 converts the electric signals output from an imaging unit 115 into focus detection signals and/or imaging signals. The focus detection signal is a signal for focus detection, and the imaging signal is a signal for display and/or recording. The imaging signal processing unit 116 outputs the focus detection signal to the camera system control unit 124, and outputs the imaging signal to a video signal processing unit 117. The video signal processing unit 117 processes the imaging signal output from the imaging signal processing unit 116 according to usage. For example, the video signal processing unit 117 can reduce an image blur of a video signal (image blur correction) by changing a clipping position of the video signal (a position to clip the video signal from the imaging signal) according to a correction amount of an electronic image blur correction control unit 123.

A display unit 118 displays images based on the video signal output from the video signal processing unit 117, and displays information of various control of the lens system control unit 111 as needed. A recording unit 119 (recording medium) stores various items of data including the video signal output from the video signal processing unit 117.

A power supply unit 120 supplies power to each unit of the imaging device 1 according to usage.

A camera operation unit 121 includes various operation members for the user to operate the imaging device 1. For example, the camera operation unit 121 includes a shutter release button for instructing shooting of still images, a movie recording switch for instructing recording of movies, and a selection switch for selecting a playback mode. The camera operation unit 121 includes a button for selecting whether to enable or disable a focus position guide display function described later, and a button for registering a focus position guide index value described later. The camera operation unit 121 may include a shift button for changing the focus and zoom states of the lens 200. The camera operation unit 121 outputs a signal matching (according to) a user's operation (an operation performed by the user) to the camera system control unit 124. Note that these buttons and switches may be hardware keys or may be software keys. For user operations on the imaging device 1, only ones of the hardware keys and the software keys may be used, or both of the hardware keys and the software keys may be used.

The shutter release button is configured such that a first switch (SW1) and a second switch (SW2) are turned on in order in response to push. When the user pushes the shutter release button approximately halfway, the first switch SW1 is turned on, and, when the user pushes the shutter release button to the end, the second switch SW2 is turned on. In response to turning on of SW1, the focus driving control unit 108 drives the focus unit 107 to control (adjust) the focal point (focus position), and the diaphragm driving control unit 104 drives the diaphragm unit 103 to set an appropriate exposure amount. In response to turning on of SW2, image data (the video signal output from the video signal processing unit 117) obtained from the optical image exposed to the imaging unit 115 is recorded in the recording unit 119.

When the user pushes the movie recording switch, recording of a movie starts, and, when the user pushes the movie recording switch again during recording of the movie, recording of the movie ends. Note that a switch for instructing to start recording a movie and a switch for instructing to end recording a movie may be separately provided.

A camera shake detection unit 122 detects a shake amount of the camera main body unit 100, and outputs a signal indicating the detected shake amount to the camera system control unit 124.

The camera system control unit 124 includes a CPU, and integrally controls the overall imaging device 1. The camera system control unit 124 can communicate with the lens system control unit 111 of the lens 200 via the camera communication control unit 125 and the lens communication control unit 112 of the lens 200. In a state where the lens 200 is attached to and electrically connected to the camera main body unit 100, the lens system control unit 111 and the camera system control unit 124 can communicate with each other via the lens communication control unit 112 and the camera communication control unit 125.

Focus Control

Figure 2:
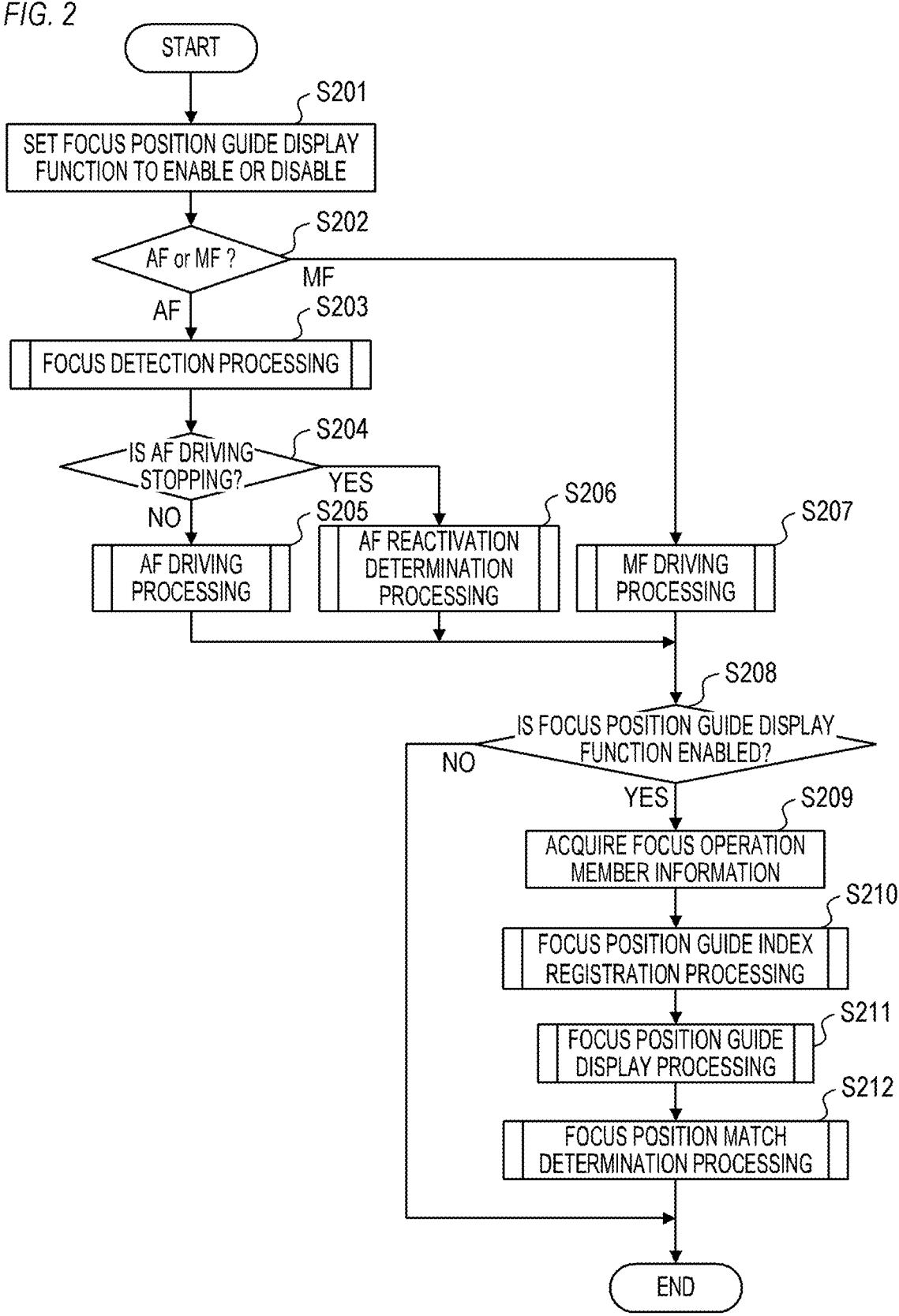
FIG. 2 is a flowchart illustrating focus control according to the present embodiment.

Next, focus control performed by the camera system control unit 124 will be described with reference to a flowchart in FIG. 2. The focus control in FIG. 2 is repeatedly performed in, for example, a shooting standby state.

In S201, the camera system control unit 124 sets the focus position guide display function to enable or disable according to a user operation on the camera operation unit 121.

A user usually repeatedly performs a focus operation while visually checking a focus adjustment degree to adjust the focus on an object by manual focus control (MF). When adjusting the focus on a first object and then adjusting the focus on a second object, a user repeatedly performs the focus operation while visually checking a focus adjustment degree. The focus position guide display function is an assist function for such a focus operation. The focus position guide display function displays the focus position guide on the display unit 118, for example, under control (display control) of the camera system control unit 124. The focus position guide indicates a current focus position in a focus range (a range in which the focus position can be changed) from an end on a close side to an end on an infinity side. The user can perform the focus operation while checking the current focus position looking at the focus position guide, so that it is possible to expect an effect of reduction of a user's burden and reduction of a time taken until the focus is adjusted.

The focus range is the range from the close end to the infinity end determined according to a mechanical configuration of the lens 200 in the first embodiment, yet is not limited to this. For example, the focus range may be an arbitrary range designated (set) by the user.

The current focus position may be registered as the focus position guide index value in response to the user's operation (an instruction from the user) under control (registration control) of the camera system control unit 124. Furthermore, the focus position guide may indicate the current focus position and the focus position guide index value. The user can perform the focus operation while checking current and past focus positions looking at the focus position guide, so that it is possible to expect the above effect of reduction of the user's burden and reduction of the time taken until the focus is adjusted.

For example, the user instructs registration of the focus position guide index value in a state where the focus is adjusted on the first object. As a result, the focus position guide indicating the current focus position and the focus position guide index value (the focus position at which the focus is adjusted on the first object) is displayed. After adjusting the focus on the second object, the user can bring the focus position close to the focus position guide index value while checking the current focus position and the focus position guide index value looking at the focus position guide, and adjust the focus on the first object again.

In S202, the camera system control unit 124 determines whether current settings of focus control are settings for performing automatic focus control (AF) or settings for performing manual focus control (MF). In a case of the settings for performing AF, the processing proceeds to S203, and in a case of the settings for performing MF, the processing proceeds to S207.

In S203, the camera system control unit 124 performs focus detection processing. The first embodiment assumes that defocus information and the degree of reliability for performing image plane phase difference AF is acquired by the focus detection processing. Details of the focus detection processing will be described later with reference to FIG. 3.

In S204, the camera system control unit 124 determines whether or not AF driving is stopping. AF driving stop is a state where driving of the focus lens is stopped. The first embodiment assumes that, when it is determined that a current state is a focus adjustment state, driving of the focus lens is stopped. In a case where AF driving is not stopping, the processing proceeds to S205, and, in a case where AF driving is stopping, the processing proceeds to S206. The first embodiment assumes that whether or not AF driving is stopping is determination on whether or not an AF driving stop flag is set to on. The AF driving stop flag is set to on (a state where AF driving stop is enabled) during processing in S205 described later, and is set to off (a state where AF driving stop is disabled) during processing in S206 described later.

In S205, the camera system control unit 124 performs AF driving processing based on the information acquired in S203. Subsequently, the processing proceeds to S208. Details of the AF driving processing will be described later with reference to FIG. 4.

In S206, the camera system control unit 124 performs AF reactivation determination processing. Subsequently, the processing proceeds to S208. The AF reactivation determination processing is processing of determining whether or not to resume driving the focus lens. When, for example, a main object changes while AF driving is stopping, it is determined to resume driving the focus lens. Details of the AF reactivation determination processing will be described later with reference to FIG. 5.

In S207, the camera system control unit 124 performs MF driving processing. Subsequently, the processing proceeds to S208. Details of the MF driving processing will be described later with reference to FIG. 6.

In S208, the camera system control unit 124 determines whether or not the focus position guide display function is set to enable. In a case where the focus position guide display function is set to enable, the processing proceeds to S209. Furthermore, a series of processing related to the focus position guide display function are performed. In a case where the focus position guide display function is set to disable, the focus control in FIG. 2 is finished.

In S209, the camera system control unit 124 acquires the focus operation member information related to the focus operation member to be used. For example, the camera system control unit 124 acquires the focus operation member information from the lens 200 via the camera communication control unit 125 and the lens communication control unit 112. In a case where the focus operation member information related to the focus operation member to be used is stored in the recording unit 119 of the camera main body unit 100, the camera system control unit 124 may acquire the focus operation member information from the recording unit 119.

The focus operation member information includes, for example, operation range information which indicates an operation range of the focus operation, and operation direction information which indicates a relationship between an operation direction of the focus operation and a change direction of the focus position. The operation range of the focus operation is a range of the operation amount of the focus operation which the user can perform on the focus operation member. As described above, the first embodiment assumes that the focus range is a range from the close end to the infinity end determined according to the mechanical configuration of the lens 200. Hence, the operation range of the focus operation corresponds to the operation amount (effective operation amount) of the focus operation member which is necessary to change the focus position from one of the close end and the infinity end to the other one thereof.

Hereinafter, a case will be considered where the focus operation member is a ring-shaped rotation operation member (focus ring). In this case, the operation range of the focus operation corresponds to the rotation angle (effective operation angle) of the focus operation member which is necessary to change the focus position from one of the close end and the infinity end to the other one thereof. The operation direction of the focus operation is the rotation direction of the focus operation member. The operation direction information indicates that, in a case where, for example, the focus operation member is rotated in a first direction, the focus position changes from the close end to the infinity side, and, in a case where the focus operation member is rotated in a second direction, the focus position changes from the infinity side to the close side.

In S210, the camera system control unit 124 performs focus position guide index value registration processing. Details of the focus position guide index value registration processing will be described later with reference to FIG. 7.

In S211, the camera system control unit 124 performs focus position guide display processing. The operation range of the focus operation and the relationship between the operation direction of the focus operation and the change direction of the focus operation depends on a lens type. Therefore, when the same focus position guide is displayed irrespectively of the lens type, a user's sense and display of the focus position guide during the focus operation do not match, and the user cannot easily (intuitively) perform a desired focus operation in some cases. Hence, in S211, the camera system control unit 124 performs focus position guide display processing using the focus operation member information acquired in S209. Details of the focus position guide display processing will be described later with reference to FIG. 9.

In S212, the camera system control unit 124 performs current focus position match determination processing. According to this match determination processing, the camera system control unit 124 determines whether or not the current focus position matches with the focus position guide index value registered in S210. Details of the focus position match determination processing will be described later with reference to FIG. 8.

The focus control performed by the camera system control unit 124 has been described above. By periodically performing the focus control, the focus position and the focus position guide are periodically updated.

Note that, although the focus control is repeatedly performed in the shooting standby state, the present invention is not limited to this. For example, the MF driving processing (S207) may be repeatedly performed only while the user operation is performed on the lens operation unit 109. That the focus position guide display function has been set to enable may trigger repetition of a series of processing (S209 to S212) related to the focus position guide display function until the focus position guide display function is set to disable. In addition, various modifications and changes are possible.

Focus Detection Processing

Next, the focus detection processing performed in S203 in FIG. 2 will be described with reference to a flowchart in FIG. 3. In S301, the camera system control unit 124 acquires a pair of image signals (image data) from an arbitrarily set distance measurement range. In S302, the camera system control unit 124 calculates a correlation amount of the pair of image signals acquired in S301. In S303, the camera system control unit 124 calculates a correlation change amount from the correlation amount calculated in S302. In S304, the camera system control unit 124 calculates an out-of-focus amount from the correlation change amount calculated in S303. In S305, the camera system control unit 124 calculates the degree of the out-of-focus amount calculated in S304. In S306, the camera system control unit 124 converts the out-of-focus amount calculated in S304 into a defocus amount. The camera system control unit 124 performs the processing in S301 to S306 on each of one or more distance measurement areas which exist in a distance measurement range. In S307, the distance measurement areas used for AF are determined.

AF Driving Processing

Next, the AF driving processing performed in S205 in FIG. 2 will be described with reference to the flowchart in FIG. 4. The AF driving processing is performed in a case where AF driving is not stopping. According to the AF driving processing, whether or not to enable AF driving stop is determined, and, in a case where AF driving stop is not enabled, the focus lens is driven.

Figure 3:
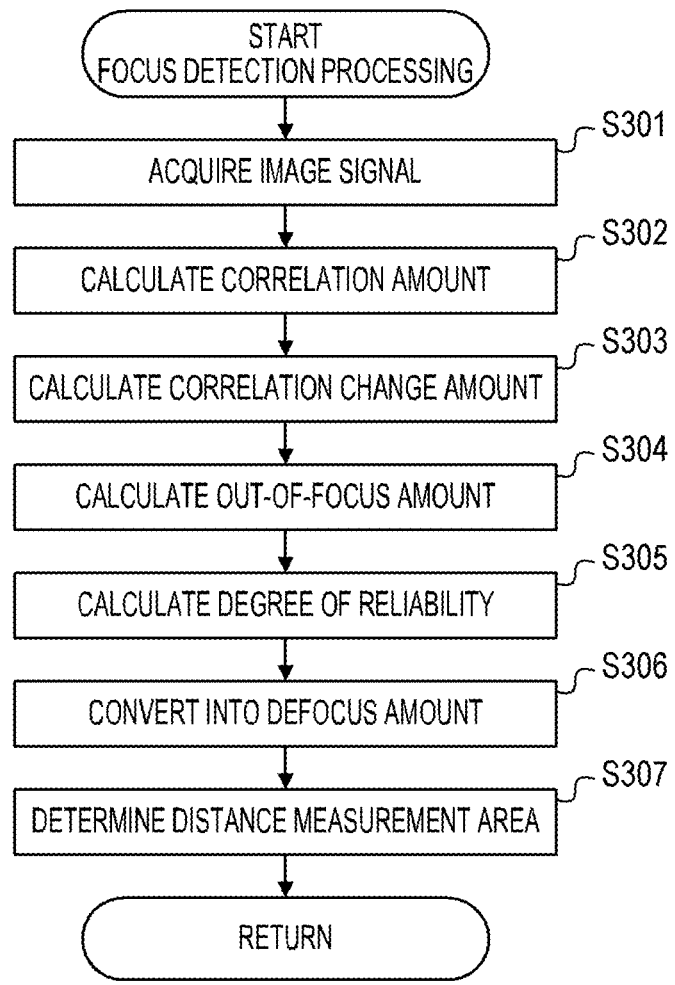
FIG. 3 is a flowchart illustrating focus detection processing according to the present embodiment.

In S401, the camera system control unit 124 determines for the distance measurement area determined in S307 in FIG. 3 whether or not a condition that the defocus amount calculated in S306 is within a predetermined depth, and the degree of reliability calculated in S305 is higher than a predetermined value is satisfied. When this condition is satisfied, the processing proceeds to S402, and, in a case where this condition is not satisfied, the processing proceeds to S403. The predetermined depth is, for example, an object depth or is a predetermined multiple of the object depth.

In S402, the camera system control unit 124 determines that the current state is the focus adjustment state, and sets the AF driving stop flag to on (the state where AF driving stop is enabled). Thus, when it is determined that the current state is the focus adjustment state, driving of the focus lens is stopped, and whether or not to resume driving the focus lens is determined by the AF reactivation determination processing in S206.

In S403, the camera system control unit 124 determines a driving speed, a driving amount, and a driving direction of the focus lens.

In S404, the camera system control unit 124 drives the focus lens according to the driving speed, the driving amount, and the driving direction determined in S403, and updates the focus position.

AF Reactivation Determination Processing

Figure 5:
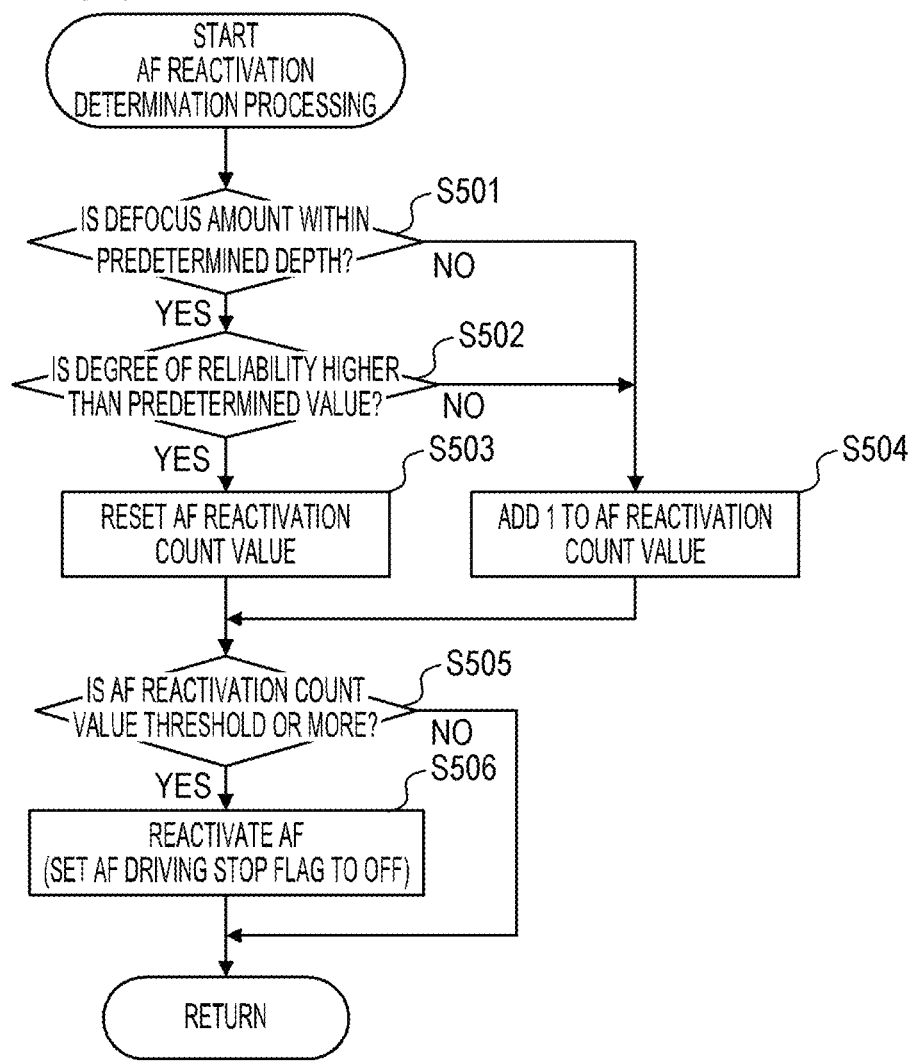
FIG. 5 is a flowchart illustrating AF reactivation determination processing according to the present embodiment.

Next, the AF reactivation determination processing performed in S206 in FIG. 2 will be described with reference to a flowchart in FIG. 5. AF reactivation determination is performed while AF driving is stopping. According to the AF reactivation determination processing, whether or not to disable AF driving stop (whether or not to resume driving the focus lens) is determined.

In S501, the camera system control unit 124 determines for the distance measurement area determined in S307 in FIG. 3 whether or not the defocus amount calculated in S306 is within the predetermined depth. In a case where the defocus amount is within the predetermined depth, the processing proceeds to S502, and, in a case where the defocus amount is within the predetermined depth, the processing proceeds to S504. The predetermined depth is, for example, the object depth or is a predetermined multiple of the object depth.

In S502, the camera system control unit 124 determines for the distance measurement area determined in S307 in FIG. 3 whether or not the degree of reliability calculated in S305 is higher than the predetermined value. In a case where the degree of reliability is higher than the predetermined value, the processing proceeds to S503, and, in a case where the degree of reliability is the predetermined value or less, the processing proceeds to S504.

In S503, the camera system control unit 124 resets an AF reactivation count value to 0. Subsequently, the processing proceeds to S505.

In S504, the camera system control unit 124 adds 1 to the AF reactivation count value. Subsequently, the processing proceeds to S505.

In a case where the defocus amount is large or the degree of reliability is low, it is highly probable that a shooting target main object has changed. Hence, in such a case, the camera system control unit 124 adds 1 to the AF reactivation count value in S504 to prepare for resumption of driving of the focus lens. In a case where the defocus amount is small or the degree of reliability is high, the camera system control unit 124 resets the AF reactivation count value in S503 to continue stopping driving the focus lens.

Figure 4:
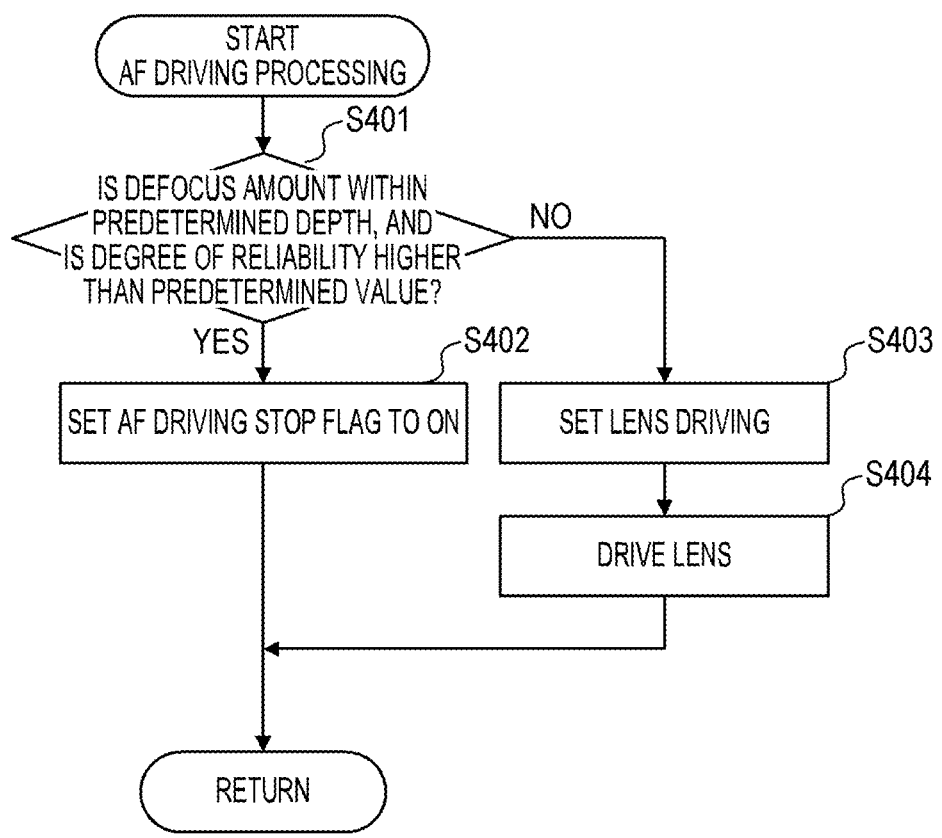
FIG. 4 is a flowchart illustrating AF driving processing according to the present embodiment.

Note that thresholds (thresholds of the defocus amount and the degree of reliability) used in S501 and S502 may be the same as a threshold used in S401 in FIG. 4, or may be different. Various thresholds may be changed as appropriate. In a case where, for example, a change of the main object needs to be changed with high sensitivity, a small threshold (e.g., depth of field) may be used in S501. In a case where erroneous detection of the change of the main object needs to be suppressed, a large threshold (e.g., a predetermined multiple of the depth of field) may be used in S501. Similarly, in a case where the change of the main object needs to be detected with high sensitivity, a small threshold may be used in S502. In a case where erroneous detection of the change of the main object needs to be suppressed, a large threshold may be used in S502.

In S505, the camera system control unit 124 determines whether or not the AF reactivation count value is a predetermined threshold or more. In a case where the AF reactivation count value is the predetermined threshold or more, the processing proceeds to S506, and, in a case where the AF reactivation count value is less than the predetermined threshold, the AF reactivation determination processing in FIG. 5 is finished.

In S506, the camera system control unit 124 determines that the main object has changed, and sets the AF driving stop flag to off (the state where AF driving stop is disabled).

MF Driving Processing

Figure 6:
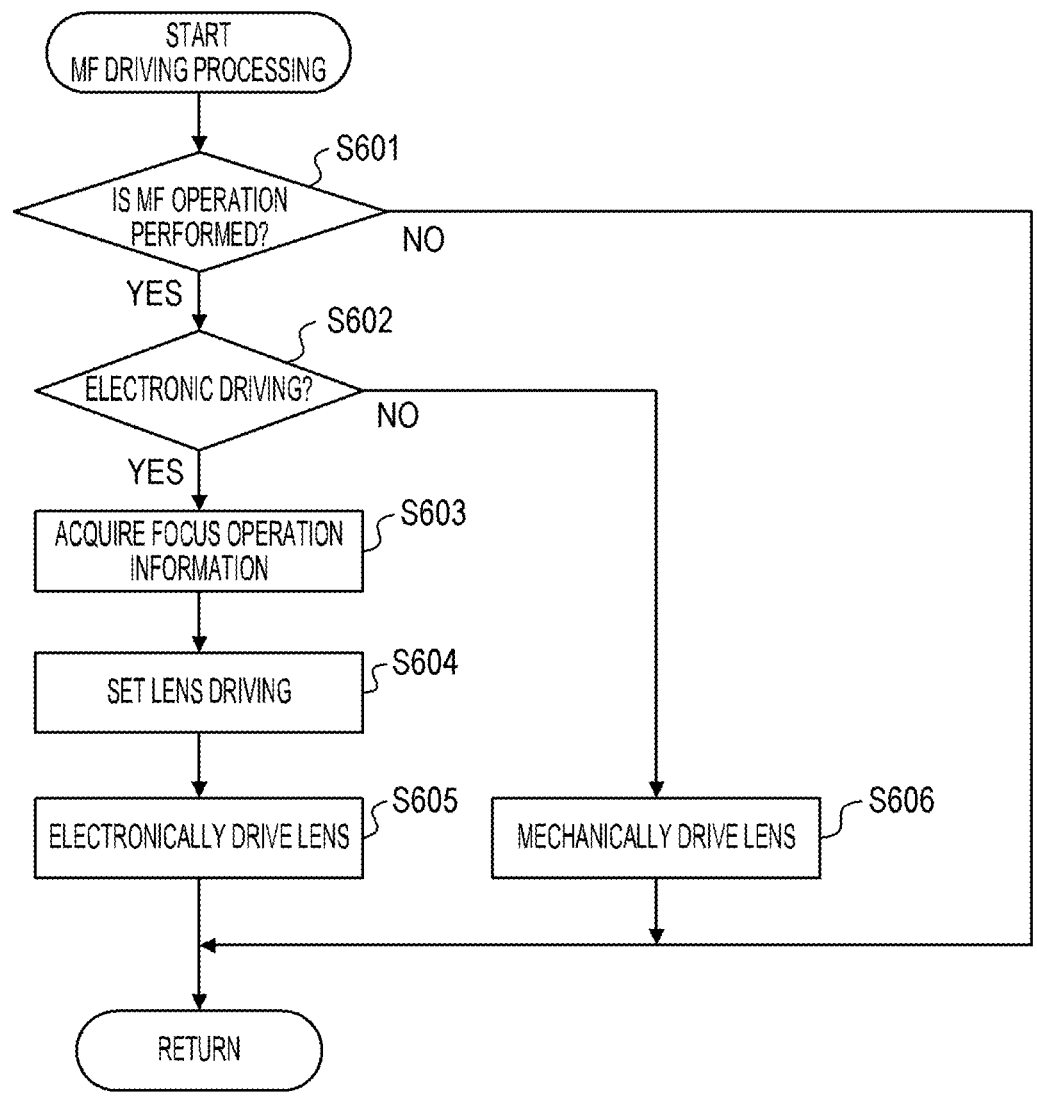
FIG. 6 is a flowchart illustrating MF driving processing according to the present embodiment.

Next, the MF driving processing performed in S207 in FIG. 2 will be described with reference to a flowchart in FIG. 6.

In S601, the camera system control unit 124 determines whether or not the focus operation (manual focus operation) has been performed. In a case where the focus operation has been performed, the processing proceeds to S602, and, in a case where the focus operation has not been performed, the MF driving processing in FIG. 6 is finished.

In S602, the camera system control unit 124 determines whether the focus lens position is electronically changed or mechanically changed. This determination may be interpreted as determination on whether the focus operation member is a member which is mechanically connected to the focus unit 107 or the focus driving control unit 108, or a member which electronically transmits the focus operation information to the focus driving control unit 108. In a case where the focus lens position is electronically changed, the processing proceeds to S606, and, in a case where the focus lens position is mechanically changed, the processing proceeds to S603.

In S603, the camera system control unit 124 acquires the focus operation information generated based on the focus operation. For example, the lens system control unit 111 receives the focus operation information matching the focus operation from the lens operation unit 109, and detects the direction of the focus operation and the operation amount of the focus operation based on the focus operation information. The lens system control unit 111 converts the focus operation information into information indicating the direction of the focus operation and the operation amount of the focus operation. Furthermore, the lens system control unit 111 transmits the converted focus operation information to the camera system control unit 124 via the lens communication control unit 112 and the camera communication control unit 125.

In S604, the camera system control unit 124 determines the driving speed, the driving amount, and the driving direction of the focus lens based on the focus operation information acquired in S603.

In S605, the camera system control unit 124 drives the focus lens according to the driving speed, the driving amount, and the driving direction determined in S604, and updates the focus position. For example, the camera system control unit 124 transmits information of the driving speed, the driving amount, and the driving direction of the focus lens to the lens system control unit 111 via the camera communication control unit 125 and the lens communication control unit 112. The lens system control unit 111 transmits a driving command for the focus lens to the focus driving control unit 108 based on the received information (the driving speed, the driving amount, and the driving direction). Furthermore, the focus driving control unit 108 drives the focus lens (focus lens 107) according to the received driving command.

In S606, the focus lens (focus lens 107) is driven in response to the focus operation. Note that, in the case where the focus lens position is mechanically changed, too, the focus operation information may be acquired.

Focus Position Guide Index Value Registration Processing

Next, the focus position guide index value registration processing performed in S210 in FIG. 2 will be described with reference to a flowchart in FIG. 7.

In S701, the camera system control unit 124 determines whether or not to register the current focus position as the focus position guide index value. For example, a function of registering the focus position guide index value is assigned to an assign button included in the camera operation unit 121 in FIG. 1, and determines whether or not the user has pushed the assign button. In a case where the current focus position is registered as the focus position guide index value, the processing proceeds to S702, and, in a case where the current focus position is not registered as the focus position guide index value, the processing proceeds to S703.

In S702, the camera system control unit 124 registers the current focus position as the focus position guide index value. Then, the processing proceeds to S703. For example, it is assumed that 216 positions (0 to 65535) aligned at equal intervals from the close end to the infinity end are focus position guide index value candidates, and three focus position guide index values can be registered at maximum for one lens ID. Note that the number of the focus position guide index values which can be registered, and the number of the focus position guide index value candidates are not limited.

In S703, the camera system control unit 124 selects whether or not to change sensitivity of the focus position match determination processing performed in S212 in FIG. 2. For example, the camera system control unit 124 determines whether or not the user has instructed to change the sensitivity using the camera operation unit 121 in FIG. 1. In a case where the sensitivity is changed, the processing proceeds to S704, and, in a case where the sensitivity is not changed, the registration processing in FIG. 7 is finished.

In S704, the camera system control unit 124 sets the sensitivity of the match determination processing performed in S212. For example, the sensitivity can be set at five levels, and, according to the set sensitivity, a match range for determining that the registered focus position guide index value and the current focus position match is set. A rate for a maximum value of the focus position guide index values may be set as the sensitivity, and a range centered around the focus position guide index value may be set as the match range according to the rate.

Focus Position Match Determination Processing

Figure 8:
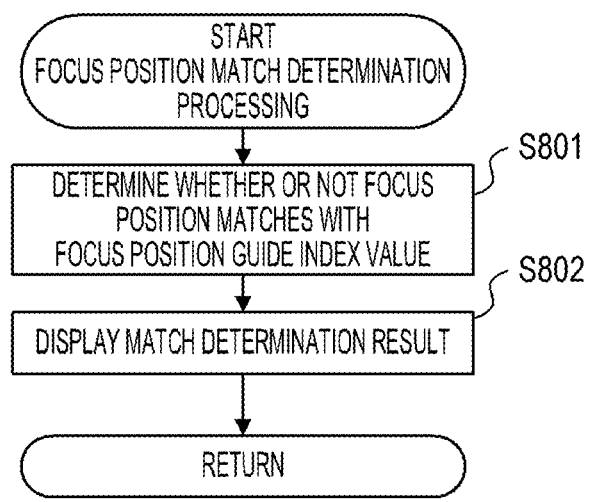
FIG. 8 is a flowchart illustrating match determination processing according to the present embodiment.

Next, the focus position match determination processing performed in S212 in FIG. 2 will be described with reference to a flowchart in FIG. 8.

Figure 7:
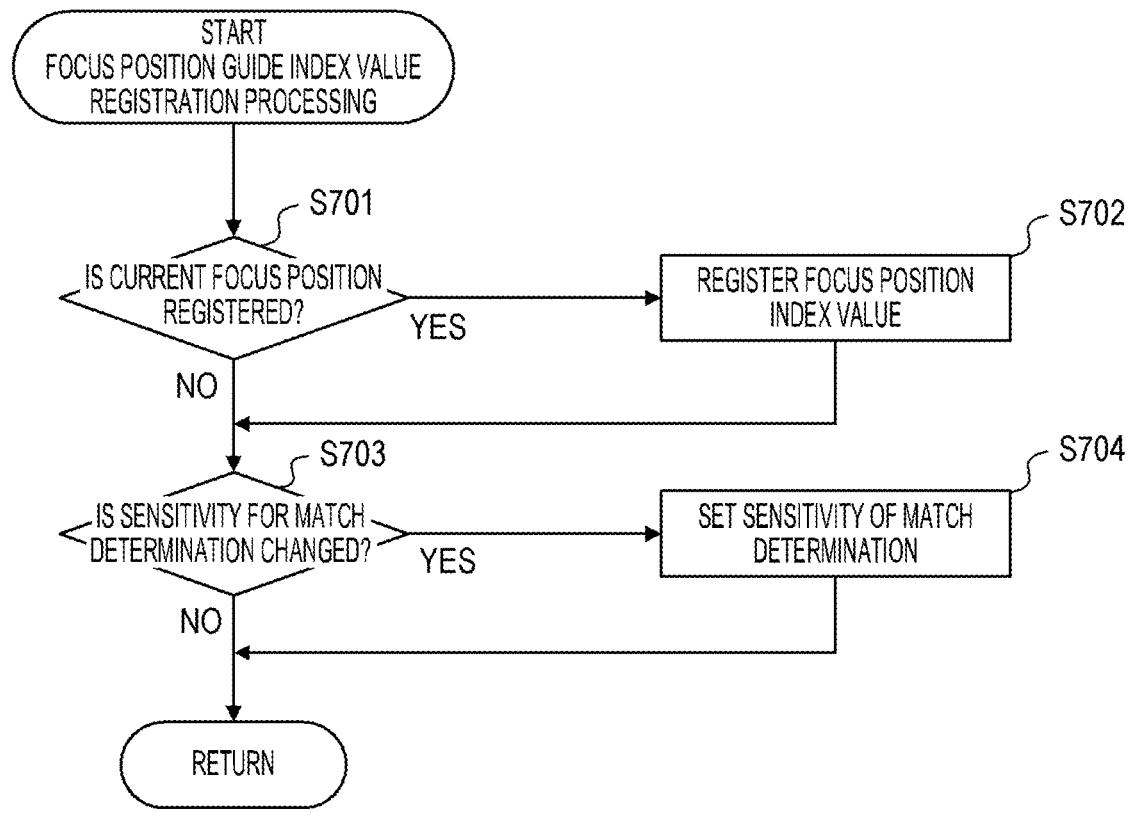
FIG. 7 is a flowchart illustrating registration processing according to the present embodiment.

In S801, the camera system control unit 124 determines whether the focus position guide index value registered in S702 and the current focus position (a processing result in S404 or S605) match at the sensitivity set in S704 in FIG. 7.

Figure 12:
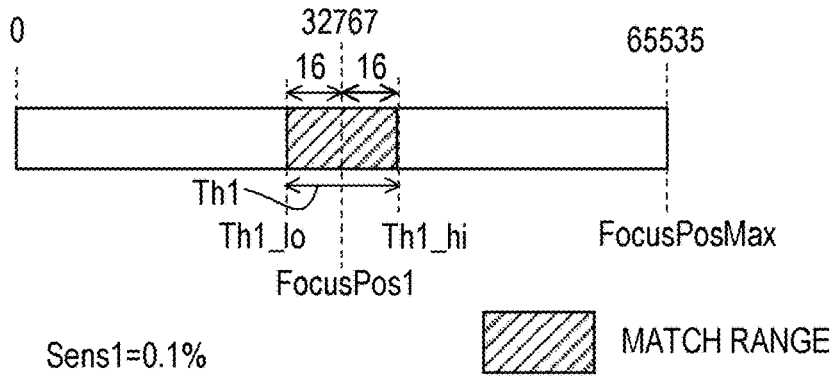
FIG. 12 is a view illustrating a match range according to the present embodiment.

For example, the camera system control unit 124 sets the match range for determining that the registered focus position guide index value and the current focus position match using following equations 1 to 3. In equations 1 to 3, FocusPosMax represents the maximum value of the focus position guide index value, Sens1 represents the sensitivity, Th1 represents the size of the match range, and FocusPos1 represents the focus position guide index value. Furthermore, Th1_lo represents the end (close side) of the match range, and Th1_hi represents the end (infinity side) of the match range. FIG. 12 illustrates the match range at a time of FocusPosMax=65535, FocusPos1=32767, and Sens1=0.05% (=0.0005). Furthermore, the camera system control unit 124 determines whether or not there is the match range including the current focus position. In a case where there is the match range including the current focus position, it is determined that the current focus position matches with the focus position guide index value matching the match range. In a case where there is not the match range including the current focus position, it is determined that the current focus position does not match with the focus position guide index value.

$$Th1 = FocusPosMax \times Sens1 \quad \text{(Equation 1)}$$

$$Th1\_lo = FocusPos1 - Th1/2 \quad \text{(Equation 2)}$$

$$Th1\_hi = FocusPos1 + Th1/2 \quad \text{(Equation 3)}$$

Figure 14A:
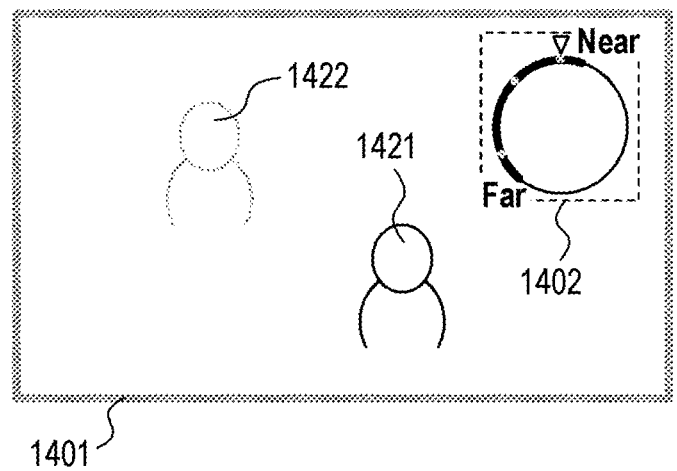
FIG. 14A is a view illustrating a match guide and the focus position guide according to the first embodiment.

In S802, the camera system control unit 124 displays on the display unit 118 a determination result on whether or not the current focus position matches with the focus position guide index value. In a case where, for example, the current focus position matches with the focus position guide index value as illustrated in FIG. 14A, a match guide 1401 is displayed (the outline of the screen is highlighted). FIG. 14A illustrates an example of the screen (display screen) displayed on the display unit 118). In a case where the current focus position does not match with the focus position guide index value, the match guide 1401 is not displayed. Consequently, it is possible to identify whether or not the current focus position matches with the focus position guide index value. The screen may be displayed on an entire display surface (a surface which displays various images and various screens) included in the display unit 118, or may be displayed on part of the display surface. The match guide 1401 may be interpreted as part of the focus position guide.

Focus Position Guide Display Processing

Next, the focus position guide display processing performed in S211 in FIG. 2 will be described with reference to a flowchart in FIG. 9.

In S901, the camera system control unit 124 displays the focus position guide on the display unit 118 based on the focus operation member information acquired in S209 in FIG. 2. The first embodiment assumes that the focus operation member is the focus ring (rotation operation member). Furthermore, as described above, the first embodiment assumes that the focus range is the range from the close end to the infinity end determined according to the mechanical configuration of the lens 200. Hence, as the focus position guide, a guide is displayed which includes a portion (focus range portion) which is long in a circumferential direction (a predetermined direction which substantially matches with the circumferential direction), and includes one end whose position in the circumferential direction corresponds to the close end and an other end whose position in the circumferential direction corresponds to the infinity end.

Figure 13:
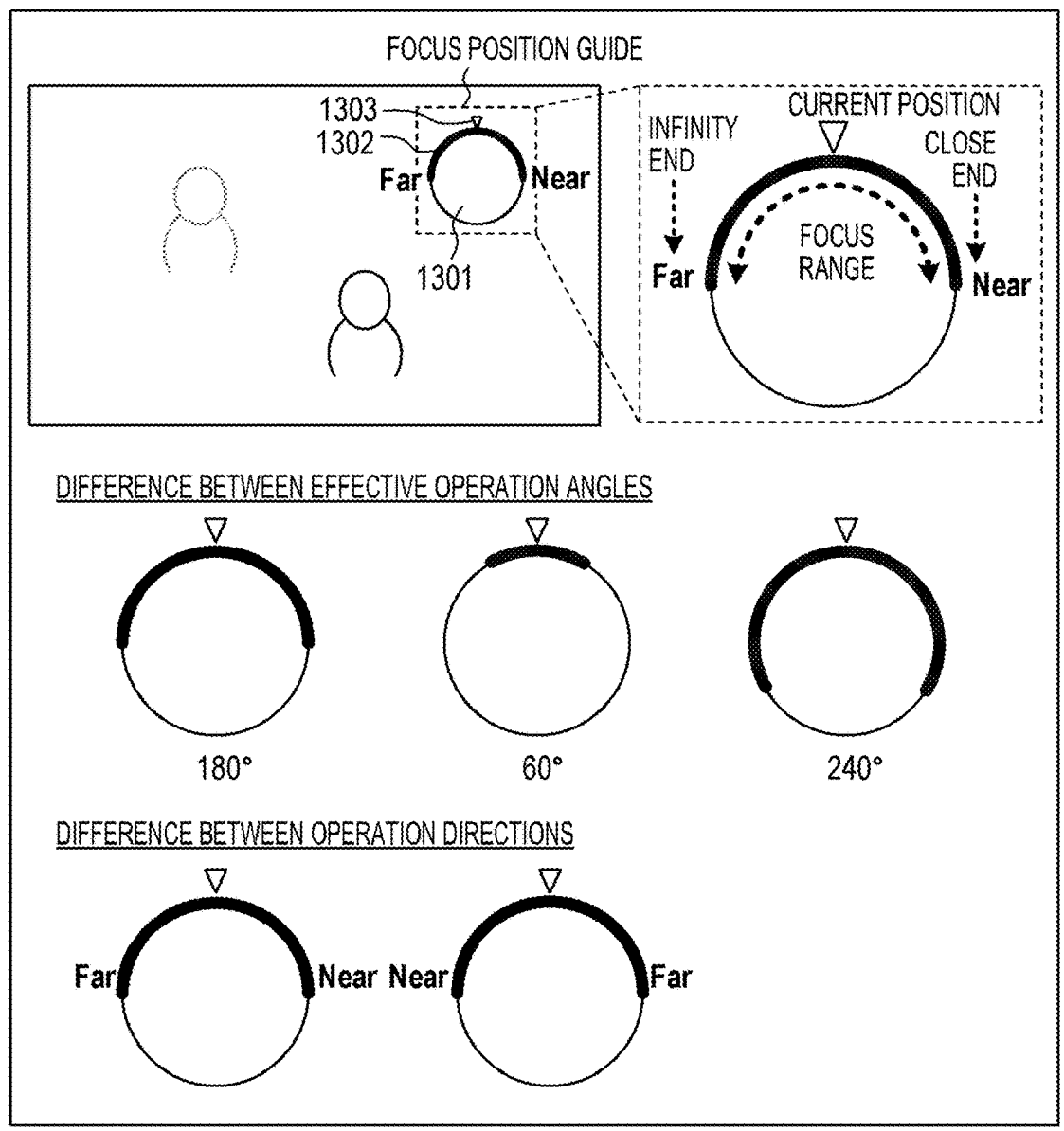
FIG. 13 is a view illustrating a focus position guide according to the first embodiment.

For example, the focus position guide illustrated in FIG. 13 is displayed. The focus position guide in FIG. 13 includes an item 1301 which includes a focus range portion 1302 (bold arc), and an item 1303 (icon) which indicates the current focus position according to (by) a positional relationship with the focus range portion 1302. "Near" in FIG. 13 means that this position corresponds to the close end, and "Far" means that this position corresponds to the infinity end.

Note that, instead of character strings such as "Near" and "Far", icons may indicate the close end and the infinity end. The entire item 1301 may correspond to the focus range portion 1302, and, for example, an arc-shaped item may be displayed as the item 1301. As the item 1301, a fan-shaped item whose entire arc portion is the focus range portion may be displayed. The focus range portion 1302 may include a plurality of portions which are aligned in the circumferential direction (predetermined direction) and have different colors from each other. For example, the focus range portion 1302 may be displayed as a gradation in the circumferential direction. Furthermore, the camera system control unit 124 may display the item 1303 with a color of a portion corresponding to the current focus position among the plurality of portions.

The camera system control unit 124 sets the length of the focus range portion 1302 (arc) in the circumferential direction (predetermined direction) based on the operation range information (the operation range of the focus operation) included in the focus operation member information. For example, an angle (a center angle of the arc) matching (corresponding to) the length of the focus range portion 1302 substantially matches with the effective operation angle of the focus ring.

Furthermore, the camera system control unit 124 sets the positions of the close end and the infinity end at the focus range portion 1302 (arc) based on the operation direction information (the relationship between the operation direction of the focus operation and the change direction of the focus position) included in the focus operation member information. For example, the position of the close end and the position of the infinity end at the focus range portion 1302 (arc) are set such that movement of the focus position guide in the same rotation direction as the rotation direction of the focus ring indicates the change of the focus position. The movement which indicates the change of the focus position will be described later.

Accordingly, the user's sense and display of the focus guide during the focus operation match, so that the user can easily (intuitively without hesitation) perform a desired focus operation.

In the first embodiment, the focus position guide differs depending on the lens type. As, for example, the effective operation angle of the focus ring is larger, the length (center angle) of the focus range portion (arc) is longer. In a case where the focus position is changed from the close end to the infinity side when the focus ring is turned right, and the focus position is changed from the infinity side to the close side when the focus ring is turned left, the right end of the focus range portion (arc) corresponds to the close end, and the left end corresponds to the infinity end. In a case where the focus position is changed from the infinity end to the close side when the focus ring is turned right, and the focus position is changed from the close side to the infinity side when the focus ring is turned left, the right end of the focus range portion (arc) corresponds to the infinity end, and the left end corresponds to the close end.

In S902, the camera system control unit 124 overlays the item indicating the focus position guide index value registered by the registration processing (focus position guide index value registration processing) in S210 on the focus position guide displayed in S901 to display. The item which indicates the focus position guide index value may be interpreted as part of the focus position guide.

Figure 14B:
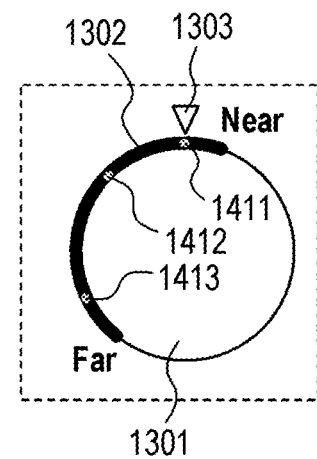
FIG. 14B is a view illustrating an index value icon of the focus position guide according to the first embodiment.

Examples of the item indicating the focus position guide index value are illustrated in FIGS. 14A and 14B. FIG. 14B is an enlargement view of a focus position guide 1402 displayed on the screen illustrated in FIG. 14A. Three index value icons 1411 to 1413 indicating three focus position guide index values are overlaid and displayed on the focus position guide 1402. The focus position guide index value associated with the index value icon 1411 is a focus position at which the focus is adjusted on a person 1421, and the focus position guide index value associated with the index value icon 1412 is a focus position at which the focus is adjusted on a person 1422.

The index value icons 1411 to 1413 are displayed in different display modes (e.g., colors). Furthermore, the match guide 1401 is displayed in the same display mode as the index value icon associated with the focus position guide index value which the current focus position has been determined match with. Consequently, even in a case where the focus position guide index values concentrate, the user can easily grasp the focus position guide index value which matches with the current focus position. In FIG. 14A, the current focus position matches with the focus position guide index value associated with the index value icon 1411.

Note that, although the example has been described where the index value icons indicating the focus position guide indices are displayed, the focus position guide index values may be indicated by other methods. For example, the example has been described where the index value icon is overlaid on the focus range portion 1302 (arc). However, similar to the item 1303 indicating the current focus position, the index value icon may be displayed outside the focus range portion 1302. Furthermore, the example has been described where the match guide 1401 which highlights the outline of the screen is displayed. However, match of the focus position and the focus position guide index value may be indicated by other methods. For example, the display mode of the item 1303 indicating the current focus position may be changed to the same display mode as the index value icon associated with the focus position guide index value which the current focus position has been determined to match with.

Figure 15:
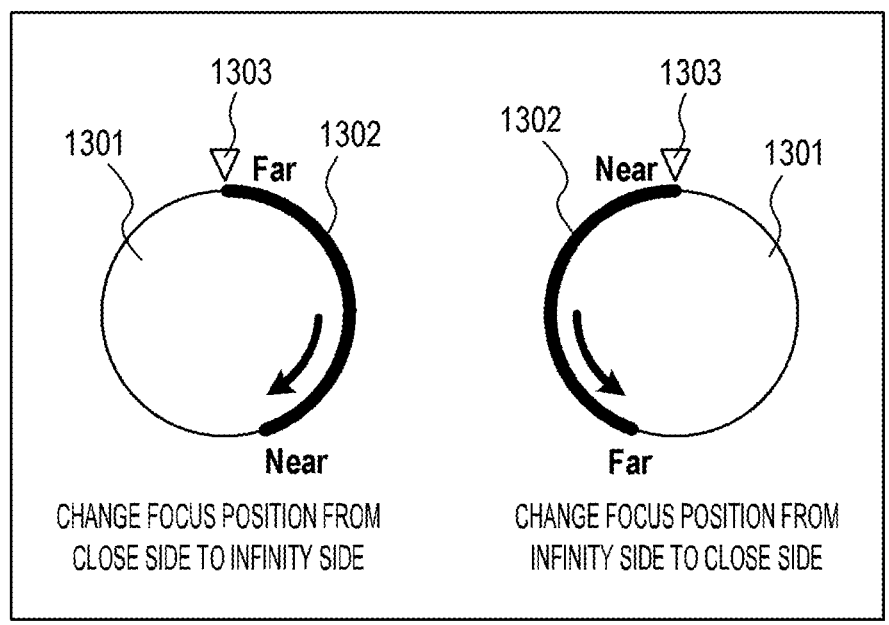
FIG. 15 is a view illustrating a change of the guide at a time of a focus operation according to the first embodiment.

In S903, the camera system control unit 124 controls display of the focus position guide to indicate the change of the focus position based on the driving speed, the driving amount, and the driving direction determined in S205 in FIG. 2 or the focus operation information acquired in S207. For example, as illustrated in FIG. 15, the item 1303 indicating the current focus position is fixed, and the item 1301 (focus range portion 1302) is rotated. The present invention is not limited to this, and various movement such as movement performed by, for example, fixing the item 1301 (focus range portion 1302) and moving the item 1303 may indicate a change of the focus position. Instead of the focus operation information acquired in S207 (S603), the driving speed, the driving amount, and the driving direction determined in S604 may be used.

Conclusion

As described above, according to the first embodiment, the length of the focus range portion is set according to the operation range of the focus operation. Furthermore, the position of the close end and the position of the infinity end of the focus range portion are set according to the relationship between the operation direction of the focus operation and the change direction of the focus position. Consequently, the user's sense and display of the focus position guide during the focus operation match, so that the user can easily (intuitively without hesitation) perform a desired focus operation.

Note that the camera system control unit 124 may hide the focus position guide in response to a lapse of a predetermined time in a state where the focus operation is not performed (e.g., a non-operation state where the user operation is not performed at all). The camera system control unit 124 may increase the degree of transparency of the focus position guide or change a display position of the focus position guide in response to the lapse of the predetermined time in the state where the focus operation is not performed. The camera system control unit 124 may control the degree of transparency of the focus position guide to the degree of transparency designated by the user. The camera system control unit 124 may move the focus position guide to a position designated by the user.

Second Embodiment

The second embodiment will be described. The second embodiment will describe an example where the focus position guide is displayed in different display modes in a case where the operation range of the focus operation is wider than a predetermined range, and in a case where the operation range of the focus operation is narrower than the predetermined range. Note that the configuration of the imaging device is the same as that in the first embodiment, and therefore description thereof will be omitted. Processing (control) other than the focus position guide display processing is also the same as those in the first embodiment, and therefore description thereof will be omitted.

Focus position guide display processing according to the second embodiment will be described with reference to a flowchart in FIG. 10. In S211 in FIG. 2, the display processing in FIG. 10 is performed in place of the display processing in FIG. 9.

In S1001, the camera system control unit 124 determines whether or not the operation range of the focus operation is wider than the predetermined range based on the focus operation member information (operation range information) acquired in S209 in FIG. 2. For example, the camera system control unit 124 determines whether or not the effective operation angle of the focus ring is larger than 360°. In a case where the operation range of the focus operation is wider than the predetermined range (a case where the effective operation angle is larger than 360°, the processing proceeds to S1002, and, in a case where the operation range of the focus operation is not wider than the predetermined range (a case where the effective operation angle is 360° or less), the processing proceeds to S1003.

Figure 16A:
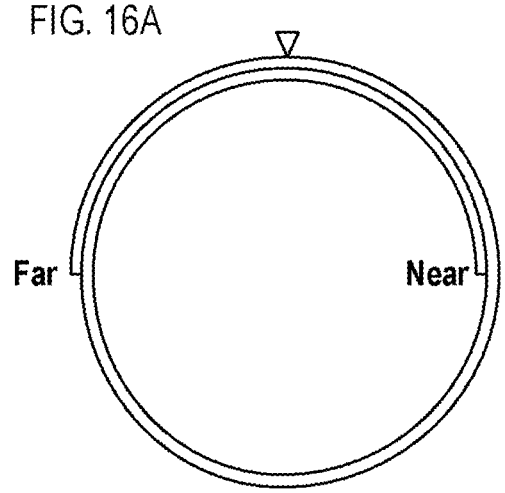
FIGS. 16A to 16F are views illustrating a focus position guide according to the second embodiment.

In S1002, the camera system control unit 124 displays the focus position guide of a first display mode on the display unit 118. Subsequently, the processing proceeds to S1004. For example, the camera system control unit 124 displays the focus position guide including a spiral focus range portion on the display unit 118 as illustrated in FIG. 16A. FIG. 16A illustrates an example of a case where the effective operation angle is 540°.

Figure 16B:
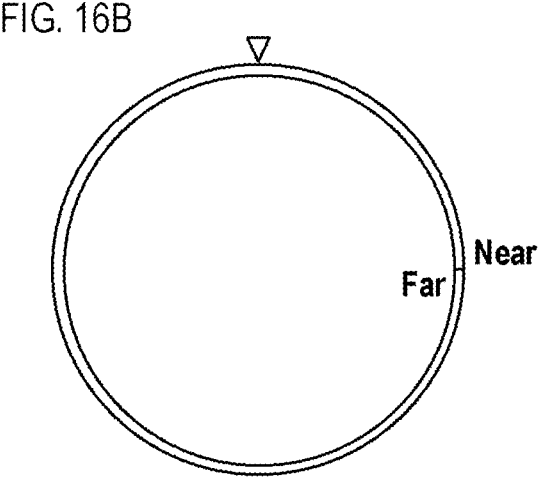

In S1003, the camera system control unit 124 displays the focus position guide of a second display mode on the display unit 118. Subsequently, the processing proceeds to S1004. In a case where, for example, the effective operation angle is smaller than 360°, the camera system control unit 124 displays the focus position guide including an arc-shaped focus range portion on the display unit 118 similar to FIG. 13. In a case where, for example, the effective operation angle is 360°, the camera system control unit 124 displays the focus position guide including a circular focus range portion on the display unit 118 as illustrated in FIG. 16B.

Figure 9:
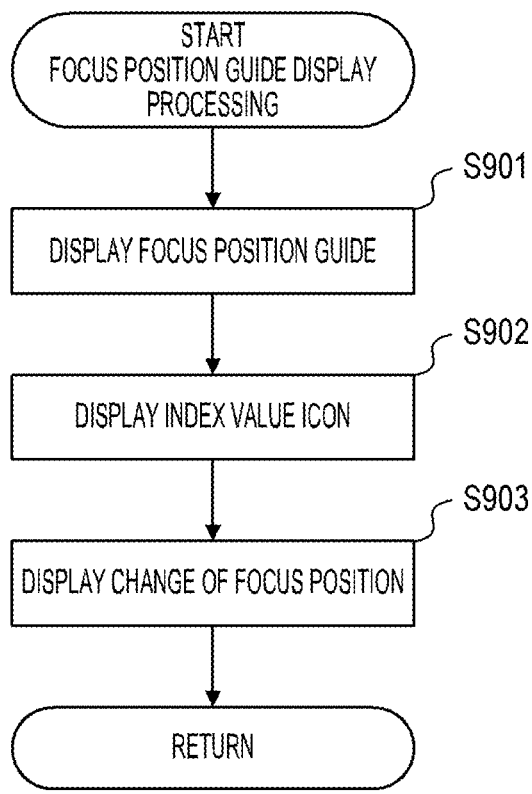
FIG. 9 is a flowchart illustrating display processing according to a first embodiment.
Figure 10:
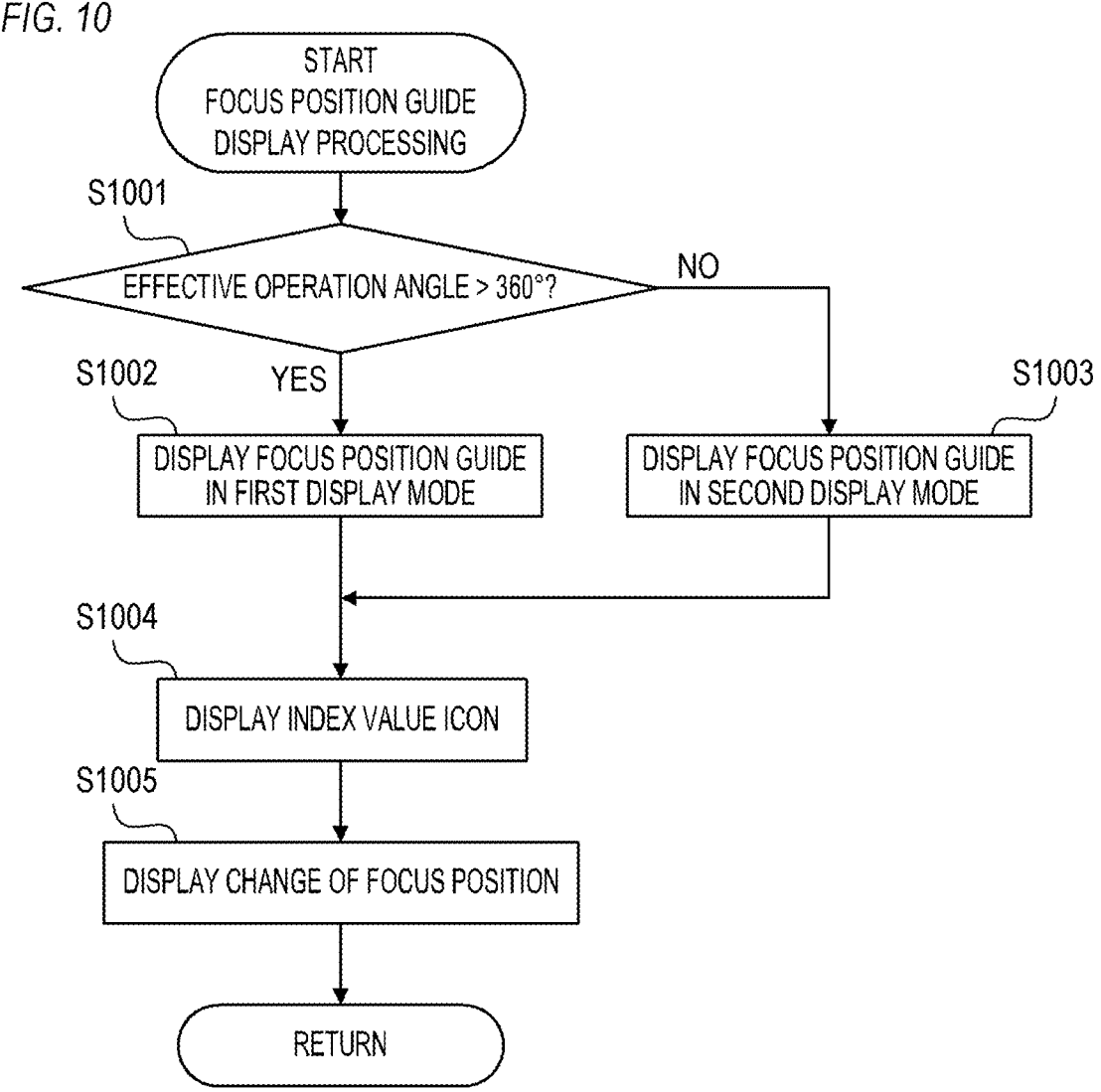
FIG. 10 is a flowchart illustrating display processing according to a second embodiment.

Processing in S1004 is the same as the processing in S902 in FIG. 9, and processing in S1005 is the same as the processing in S903.

Figure 16C:
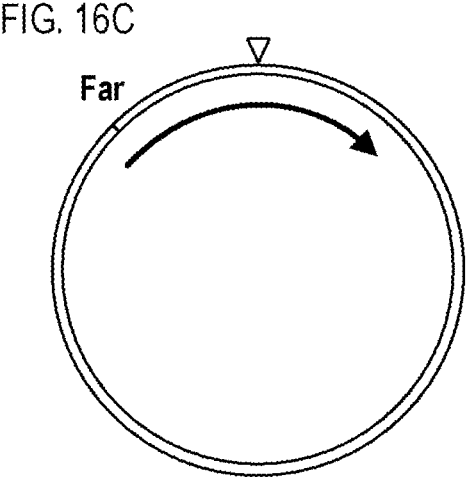
Figure 16D:
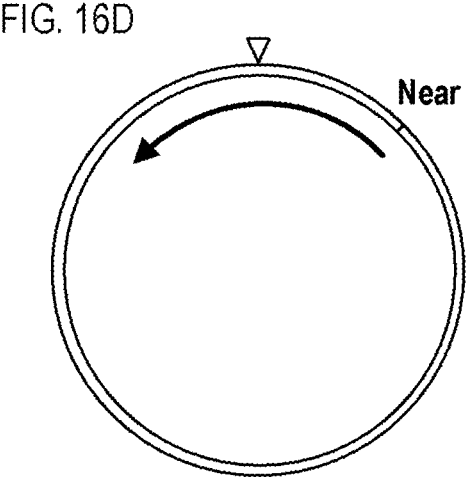

In a case where, for example, the effective operation angle is large than 360°, the portion corresponding to the close end may be hidden, and the focus range portion may be displayed in a circular shape as illustrated in FIG. 16C during the focus operation of changing the focus position from the close side to the infinity side. Similarly, the portion corresponding to the infinity end may be hidden, and the focus range portion may be displayed in a circular shape as illustrated in FIG. 16D during the focus operation of changing the focus position from the infinity side to the close side.

Figure 16E:
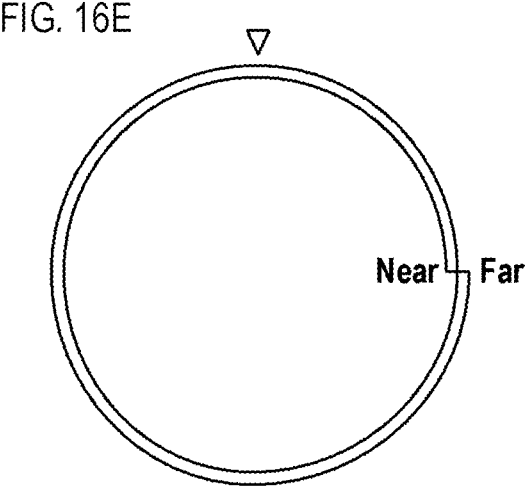
Figure 16F:
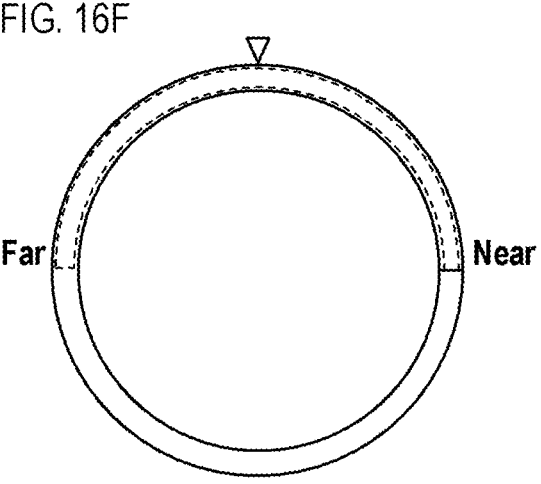

Furthermore, the display modes of the focus position guides are not limited in particular, and, in a case where, for example, the effective operation angle is 360° or less, the focus range portion may be displayed in a shape formed by making a spiral shape shorter. FIG. 16E illustrates an example of a case where the effective operation angle is 360°. In the case where the effective operation angle is larger than 360°, the focus range portion may be displayed in a circular shape as illustrated in FIG. 16F. FIG. 16F illustrates that the focus range portion is longer than one lap by transparent display, and illustrates that the effective operation angle is larger than 360°. In a case of FIG. 16F, during the focus operation of changing the focus position from the close side to the infinity side, the portion corresponding to the infinity end may be displayed in a layer higher than that of the portion corresponding to the close end. Similarly, during the focus operation of changing the focus position from the infinity side to the close side, the portion corresponding to the infinity end may be displayed in a layer higher than that of the portion corresponding to the close end.

As described above, according to the second embodiment, the focus position guides are displayed in the different display modes in the case where the operation range of the focus operation is wider than the predetermined range, and in the case where the operation range of the focus operation is narrower than the predetermined range. Consequently, even when the effective operation angle exceeds 360°, the focus position guide can indicate the entire focus range. As a result, the user can easily grasp the operation range and the operation direction of the focus operation, and easily (intuitively without hesitation) a desired focus operation.

Third Embodiment

The third embodiment will be described. The third embodiment will describe an example where the focus range portion is displayed along the outline of the screen. Note that the configuration of the imaging device is the same as that in the first embodiment, and therefore description thereof will be omitted. Processing (control) other than the focus position guide display processing is also the same as those in the first embodiment, and therefore description thereof will be omitted. In this regard, in S604 in FIG. 6, the driving speed, the driving amount, and the driving direction of the focus lens are determined based on the focus operation information and operation sensitivity arbitrarily set by the user.

Figure 11:
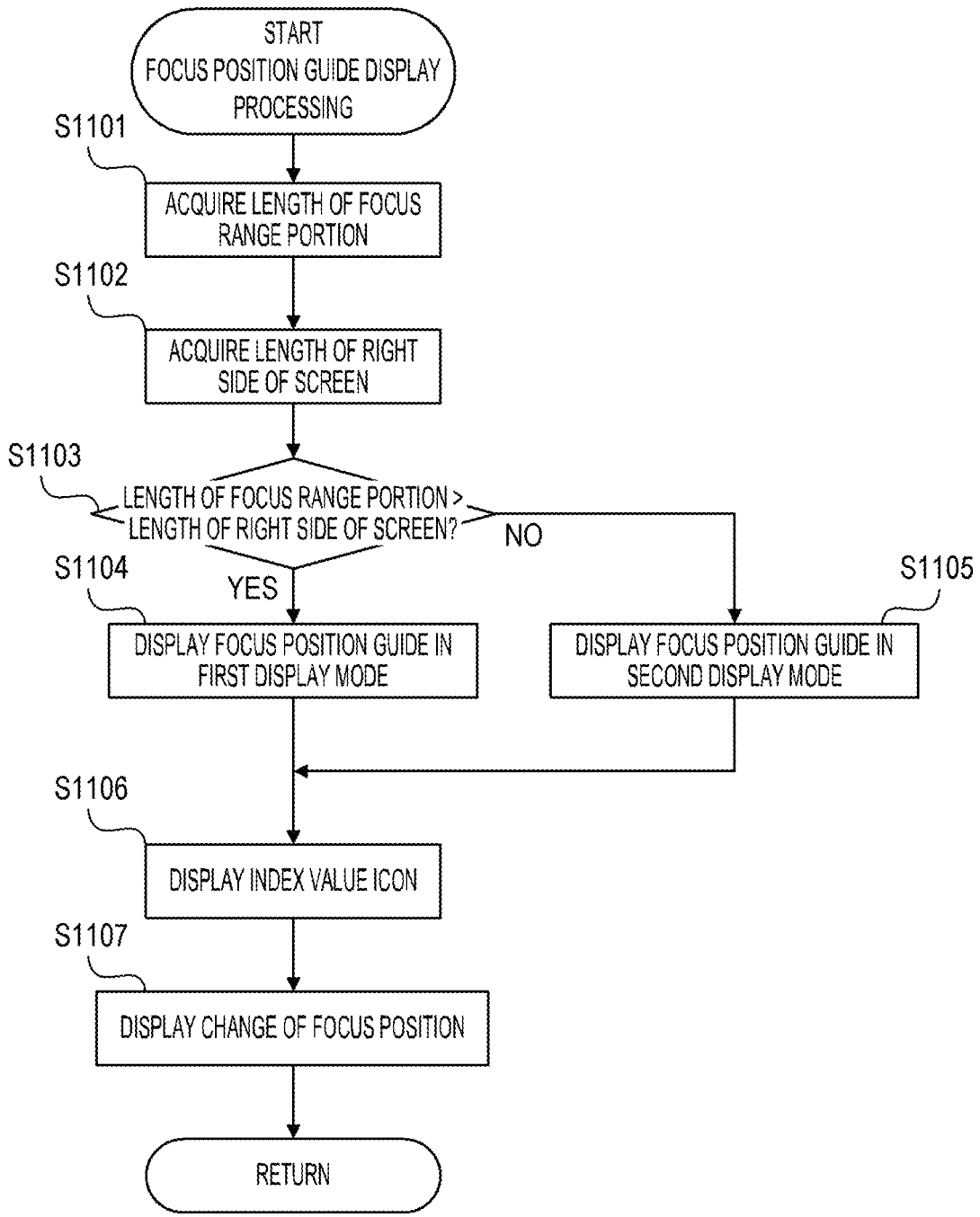
FIG. 11 is a flowchart illustrating display processing according to a third embodiment.

Focus position guide display processing according to the third embodiment will be described with reference to a flowchart in FIG. 11. In S211 in FIG. 2, the display processing in FIG. 11 is performed in place of the display processing in FIG. 9.

In S1101, the camera system control unit 124 converts the operation range information (the operation range of the focus operation such as the effective operation amount or the effective operation angle) acquired in S209 in FIG. 2 into the length of the focus range portion based on the operation sensitivity arbitrarily set by the user. In a case where, for example, the operation sensitivity is high, the focus range portion is made longer to increase movement of the focus position guide (the movement which indicates the change of the focus position) in response to a predetermined operation amount of the focus operation. In a case where, for example, the operation sensitivity is low, the focus range portion is made shorter to decrease the movement of the focus position guide (the movement which indicates the change of the focus position) in response to the predetermined operation amount of the focus operation.

In S1102, the camera system control unit 124 acquires the length of a predetermined side of the screen which displays the focus position guide. For example, the camera system control unit 124 acquires the length of the right side of the screen.

In S1103, the camera system control unit 124 determines whether or not the length of the focus range portion acquired in S1101 is longer than the length of the right side acquired in S1102. In a case where the length of the focus range portion is longer than the length of the right side of the screen, the processing proceeds to S1104, and, in a case where the length of the focus range portion is the length of the right side of the screen or less, the processing proceeds to S1105.

Figure 17A:
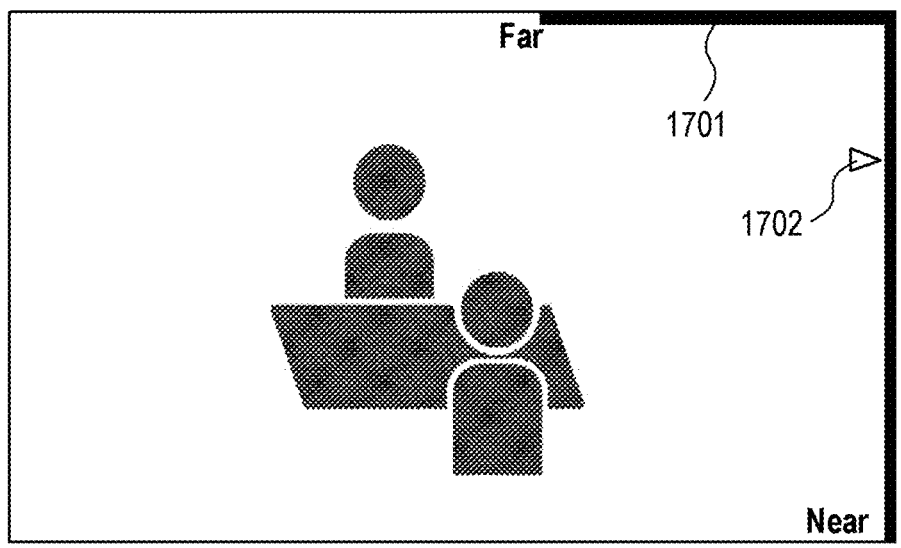
FIGS. 17A and 17B are views illustrating a focus position guide according to the third embodiment.

Note that, in place of the processing in S1101 to S1103, whether or not the effective operation angle is larger than a threshold may be determined. For example, a rotation angle which matches the length of the right side of the screen and which is smaller as the operation sensitivity is higher (the rotation angle is larger as the operation sensitivity is lower) is set as the threshold. In a case where the effective operation angle is larger than the threshold, the processing proceeds to S1104, and, in a case where the effective operation angle is the threshold or less, the processing proceeds to S1105. In S1104, the camera system control unit 124 displays the focus position guide of the first display mode on the display unit 118. Subsequently, the processing proceeds to S1106. For example, a focus position guide illustrated in FIG. 17A is displayed. The focus position guide in FIG. 17A includes a focus range portion 1701, and an item 1702 which indicates the current focus position according to a positional relationship with the focus range portion 1701. In FIG. 17A, the focus range portion 1701 is displayed along the right side and the upper side of the screen (from the right side to the upper side of the screen).

Figure 17B:
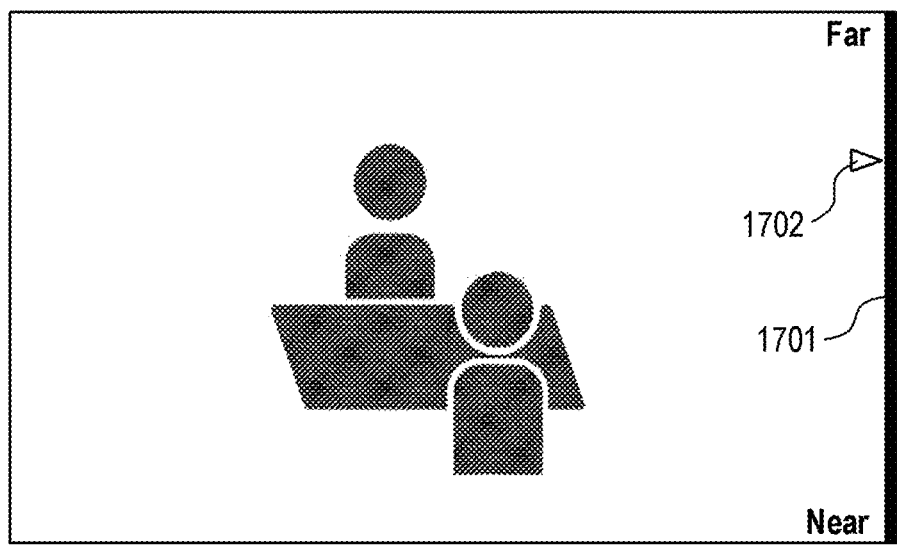

In S1105, the camera system control unit 124 displays the focus position guide of the second display mode on the display unit 118. Subsequently, the processing proceeds to S1106. For example, a focus position guide illustrated in FIG. 17B is displayed. The focus position guide in FIG. 17B also includes a focus range portion 1701 and the item 1702. In FIG. 17B, the focus range portion 1701 is displayed along only the right side of the screen. The focus range portion is displayed on the entire right side in FIG. 17B. However, the focus range portion may be displayed on part of the right side. In a case where, for example, the rotation angle matching the length of the entire right side is 360° and the effective operation angle is 180°, the focus range portion is displayed from the lower end of the right side to the center of the right side.

Processing in S1106 is the same as the processing in S902 in FIG. 9, and processing in S1107 is the same as the processing in S903. In this regard, in S1107, in a case where the focus operation information is used, the operation sensitivity arbitrarily set by the user is further used. In cases in FIGS. 17A and 17B, the item 1702 moves to indicate the change of the focus position.

Note that the focus range portion may be displayed in the circular shape, the arc shape, or the spiral shape similar to the second embodiment. In this case, in S1103, whether or not the length of the focus range portion is longer than a predetermined circumferential length may be determined.

As described above, according to the third embodiment, the focus position guides are displayed in the different display modes in the case where the length of the focus range portion is longer than the predetermined length, and in the case where the length of the focus range portion is shorter than the predetermined length. Consequently, even in a case where the effective operation amount (effective operation angle) is large, the focus position guide can indicate the entire focus range. As a result, the user can easily grasp the operation range and the operation direction of the focus operation, and easily (intuitively without hesitation) a desired focus operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-029349, filed on Feb. 28, 2023, which is hereby incorporated by reference herein in its entirety.

What is claimed is:

1. An electronic device comprising at least one memory and at least one processor which function as:
   an acquisition unit configured to acquire operation member information which is information on an operation member for a focus operation; and
   a display control unit configured to perform control to display a guide indicating a current focus position in a focus range from a first end on a close side to a second end on an infinity side based on the operation member information, wherein
   the guide includes a focus range portion which is a portion which is long in a predetermined direction, and includes one end whose a position in the predetermined direction corresponds to the first end, and an other end whose a position in the predetermined direction corresponds to the second end,
   a length of the focus range portion is a length according to an operation range which is a range of an operation amount of the focus operation which a user is able to perform on the operation member, and
   a position of the first end and a position of the second end at the focus range portion are positions according to a relationship between an operation direction of the focus operation on the operation member and a change direction of a focus position.

2. The electronic device according to claim 1, wherein the focus range is a range designated by the user.

3. The electronic device according to claim 1, wherein the focus range is a range from a close end to an infinity end determined according to a mechanical configuration of a lens.

4. The electronic device according to claim 1, wherein
   the at least one memory and the at least one processor further function as a registration control unit configured to perform control to register the current focus position according to an instruction from the user,
   the guide further indicates the registered focus position.

5. The electronic device according to claim 4, wherein the display control unit performs control to display the guide to enable identification on whether or not the current focus position matches with the registered focus position.

6. The electronic device according to claim 1, wherein the operation member information includes information indicating the operation range of the focus operation, and information indicating the relationship between the operation direction of the focus operation and the change direction of the focus position.

7. The electronic device according to claim 1, wherein
   the operation member is a rotation operation member,
   the predetermined direction substantially matches with a circumferential direction, and
   an angle corresponding the length of the focus range portion substantially matches with a rotation angle of the operation member corresponding to the operation range of the focus operation.

8. The electronic device according to claim 1, wherein
   the operation member is a rotation operation member,
   the predetermined direction substantially matches with a circumferential direction, and
   movement of the guide in a same rotation direction as a rotation direction of the operation member indicates a change of the focus position.

9. The electronic device according to claim 1, wherein the display control unit performs control to hide the guide in response to a lapse of a predetermined time in a state where the focus operation is not performed.

10. The electronic device according to claim 1, wherein the display control unit performs control to display the guide at a degree of transparency designated by the user.

11. The electronic device according to claim 1, wherein the operation range of the focus operation corresponds to an operation amount of the operation member which is necessary to change the focus position from one of the first end and the second end to other one of the first end and the second end.

12. The electronic device according to claim 1, wherein the guide includes a first item which includes the focus range portion, and a second item which indicates the current focus position by a positional relationship with the focus range portion.

13. The electronic device according to claim 1, wherein the display control unit performs control to display the guide in a different display mode in a case where the operation range of the focus operation is wider than a predetermined range, and in a case where the operation range is narrower than the predetermined range.

14. The electronic device according to claim 13, wherein the operation member is a rotation operation member, and the predetermined range is a range corresponding to 360°.

15. The electronic device according to claim 1, wherein the display control unit performs control to display the guide in a different display mode in a case where the length of the focus range portion is longer than a predetermined length, and in a case where the length of the focus range portion is shorter than the predetermined length.

16. The electronic device according to claim 15, wherein the predetermined length is a length of a predetermined side of a screen.

17. The electronic device according to claim 1, wherein
the guide includes a first item which includes the focus range portion, and a second item which indicates the current focus position by a positional relationship with the focus range portion,
the operation member is a rotation operation member, and
the display control unit
performs control to display the focus range portion in an arc shape in a case where a rotation angle of the operation member corresponding to the operation range of the focus operation is smaller than 360°, and
performs control to display the focus range portion in a spiral shape in a case where the rotation angle is larger than 360°.

18. The electronic device according to claim 17, wherein, in the case where the rotation angle is larger than 360°, the display control unit
performs control to hide a portion corresponding to the first end, and display the focus range portion in a circular shape during a focus operation of changing the focus position from a side of the first end to a side of the second end, and
performs control to hide a portion corresponding to the second end, and display the focus range portion in a circular shape during a focus operation of changing the focus position from the side of the second end to the side of the first end.

19. The electronic device according to claim 1, wherein
the guide includes a first item which includes the focus range portion, and a second item which indicates the current focus position by to a positional relationship with the focus range portion, and
the display control unit
performs control to display the focus range portion along a first side of a screen in a case where the length of the focus range portion is shorter than a length of the first side, and
performs control to display the focus range portion along the first side and a second side of the screen in contact with the first side in a case where the length of the focus range portion is longer than the length of the first side.

20. The electronic device according to claim 1, wherein
the guide includes a first item which includes the focus range portion, and a second item which indicates the current focus position by a positional relationship with the focus range portion,
the focus range portion includes a plurality of portions which are aligned in the predetermined direction and have colors different from each other, and
the display control unit performs control to display the second item with a color of a portion corresponding to the current focus position among the plurality of portions.

21. An electronic device comprising at least one memory and at least one processor which function as:
a display control unit configured to perform control to display a guide indicating a current focus position in a focus range from a first end on a close side to a second end on an infinity side, wherein
the focus position is able to be changed by rotating a focus ring provided to a lens,
the guide includes an arc including one end whose position corresponds to the first end, and an other end whose position corresponds to the second end,
a center angle of the arc substantially matches with a rotation angle of the focus ring for changing the focus position from the first end to the second end,
movement of the guide in a same rotation direction as a rotation direction of the focus ring indicates a change of the focus position, and
the guide is different in a case of a first lens and in a case of a second lens.

22. A control method of an electronic device, comprising:
acquiring operation member information which is information on an operation member for a focus operation; and
performing control to display a guide indicating a current focus position in a focus range from a first end on a close side to a second end on an infinity side based on the operation member information, wherein
the guide includes a focus range portion which is a portion which is long in a predetermined direction, and includes one end whose a position in the predetermined direction corresponds to the first end, and an other end whose a position in the predetermined direction corresponds to the second end,
a length of the focus range portion is a length according to an operation range which is a range of an operation amount of the focus operation which a user is able to perform on the operation member, and
a position of the first end and a position of the second end at the focus range portion are positions according to a relationship between an operation direction of the focus operation on the operation member and a change direction of a focus position.

23. A non-transitory computer readable medium that stores a program, wherein the program causes a computer to execute a control method of an electronic device, the control method comprising:
acquiring operation member information which is information on an operation member for a focus operation; and
performing control to display a guide indicating a current focus position in a focus range from a first end on a close side to a second end on an infinity side based on the operation member information, wherein
the guide includes a focus range portion which is a portion which is long in a predetermined direction, and includes one end whose a position in the predetermined direction corresponds to the first end, and an other end whose a position in the predetermined direction corresponds to the second end,
a length of the focus range portion is a length according to an operation range which is a range of an operation amount of the focus operation which a user is able to perform on the operation member, and a position of the first end and a position of the second end at the focus range portion are positions according to a relationship between an operation direction of the focus operation on the operation member and a change direction of a focus position.

\* \* \* \* \*